United States Patent [19]

McGinniss et al.

[11] 4,107,013

[45] Aug. 15, 1978

[54] ULTRAVIOLET CURABLE LATEXES

[75] Inventors: Vincent Daniel McGinniss, Valley City; Robert Joseph Seidewand, Olmsted Falls; James Robert Erickson, Brunswick, all of Ohio

[73] Assignee: SCM Corporation, New York, N.Y.

[21] Appl. No.: 749,883

[22] Filed: Dec. 13, 1976

[51] Int. Cl.² ............................................. C08F 8/00
[52] U.S. Cl. ........................... 204/159.16; 204/159.15; 260/29.6 RB; 260/29.7 D; 260/29.7 DP
[58] Field of Search ............... 260/29.7 D, 29.6 RB, 260/29.7 DP; 204/159.15, 159.16

[56] References Cited

U.S. PATENT DOCUMENTS

| | | | |
|---|---|---|---|
| 3,719,521 | 3/1973 | Johnson et al. | 204/159.19 |
| 3,898,087 | 8/1975 | Brutchen et al. | 204/159.16 |
| 3,899,611 | 8/1975 | Hall | 204/159.15 |

*Primary Examiner*—Eugene C. Rzucidlo
*Attorney, Agent, or Firm*—Thomas M. Schmitz

[57] ABSTRACT

An improved ultraviolet curable aqueous latex paint suitable for use as coil coatings comprises a high molecular weight primary latex binder in combination with minor amounts of an emulsified low molecular weight cross-linking agent adapted to cross-link the high molecular weight latex particles upon exposure to ultraviolet energy.

4 Claims, No Drawings

ULTRAVIOLET CURABLE LATEXES

BACKGROUND OF THE INVENTION

The present invention pertains to ultraviolet curable high molecular weight aqueous latex coatings particularly suitable for coil coating, metal decorator coating, wood base coatings, and similar industrial latex coatings.

A wide variety of ultraviolet curable coatings containing suitable ultraviolet sensitizers for initiating polymerization of ethylenically unsaturated polymers have been suggested wherein the ethylenic polymer double bonds cross-link upon exposure to a broad spectrum of ultraviolet wave energy generally between about 1,600 A and 4,000 A. Although latex coatings containing ethylenic unsaturation can be cured by ultraviolet energy, latex coatings cured by ultraviolet energy often are deficient in quality due to shrinkage of latex polymer in latex coatings which invariably produce films that are deficient in adhesion, flow-out, and leveling. Low molecular weight polymers cross-link with ultraviolet energy and exhibit good hardness and solvent resistance but are very brittle and not flexible with very poor adhesion. The inclusion of a thermoplastic deteriorates the film properties and solvent resistance. A high molecular weight polymer having reactive unsaturation exhibits very poor cure upon exposure to ultraviolet energy.

In the past, high molecular weight latex polymer particles were necessary to provide suitable film physical properties such as hardness, wear resistance, and other desirable film integrity properties to sufficiently protect the substrate and ordinarily were heated at high temperatures for time sufficient to obtain adequate flow-out and leveling of the latex particles. The high molecular weight latex particles must be maintained heated and fluid while irradiating with ultraviolet energy so as to obtain free radical propagation within the fluid film while the film coating is maintained in the fluid state. Fluidity is necessary to obtain efficient free radical propagation and thus obtain cross-linking of the ethylenic double bonds.

It now has been found that substantially improved ultraviolet curable latex coatings can be obtained by providing a high molecular weight primary latex binder in combination with an emulsified low molecular weight cross-linking oligomer or prepolymer adapted to cross-link the high molecular weight latex polymer particles upon exposure to ultraviolet energy. The high molecular weight primary binder is an ethylenically unsaturated polymer having a molecular weight preferably between about 100,000 and 1,000,000. The emulsified low molecular weight cross-linking polymer has molecular weight between about 300 and 3,000 and provides fluidity to the latex coating thereby eliminating the need for heating the coating to provide flow-out or leveling as well as eliminating the need for heating the coating during ultraviolet irradiation to maintain fluidity required for free radical propagation. The emulsified low molecular weight cross-linking polymer contains an ultraviolet sensitizer for rapidly initiating propagation of free radicals in the emulsified fluid phase which in turn substantially increases cross-linking with the high molecular weight primary binder latex. The low molecular weight cross-linker further can provide flexibility and adhesion to the substrate while still maintaining very desirable corrosion and wear resistance film characteristics of the primary high molecular weight polymer particles.

These and other advantages will become more apparent by referring to the detailed description of the invention.

SUMMARY OF THE INVENTION

Briefly, an ultraviolet curable high molecular latex suitable for industrial coating applications comprises a high molecular weight latex primary binder having a molecular weight above about 100,000 and preferably between about 250,000 and 1,000,000 which is cross-linked with a compatible emulsified low molecular weight cross-linking polymer between about 300 and 3,000. The high molecular weight latex polymer preferably contains ethylenic unsaturated double bonds preferentially attached on the surface of the high molecular weight polymer particles whereby the double bonds are oriented at or near the polymer particle surface. The emulsified phase of the low molecular weight cross-linking polymer contains an ultraviolet sensitizer whereby free radicals are rapidly initiated and propagated within the fluid emulsified phase upon exposure to ultraviolet light which then provides rapid cross-linking with double bonds in the high molecular weight latex particles of the primary binder phase.

DETAILED DESCRIPTION OF THE INVENTION

The ultraviolet curable latex of this invention is primarily based upon utilizing an emulsified phase of a low molecular weight cross-linking polymer containing an ultraviolet sensitizer for cross-linking the high molecular weight latex primary binder phase.

Referring first to the emulsified phase containing the cross-linking polymer, the emulsified cross-linking low molecular weight polymer is an oligomer or prepolymer having a molecular weight between about 300 and 3,000 and preferably between about 500 and 1,400. The low molecular weight cross-linking polymer is an ethylenically unsaturated polymer preferably containing acrylate ethylenic unsaturation. The acrylate polymer can be aliphatic or aromatic, diacrylate or multifunction acrylate containing difunctional or multifunctional acrylate or methacrylate, allyl or an acrylamide ethylenically unsaturated polymer, and can include polymers such as polyesters, urethane, melamine, epoxy, acrylic, and silicone oligomers or prepolymers having a low molecular weight between about 300 and 3,000. The low molecular weight, ethylenically unsaturated polymers can be synthesized from acrylate monomers such as 1,3-butylene glycol dimethacrylate; ethylene glycol diacrylate; ethylene glycol dimethacrylate; Bisphenol-A-dimethacrylate; diethylene glycol dimethacrylate; pentaerythritol triacrylate; pentaerythritol tetraacrylate; triethylene glycol dimethacrylate; trimethylol propane trimethacrylate; trimethylene glycol dimethacrylate; trimethylol propane triacrylate; tetraethylene glycol diacrylate; ethoxylated Bisphenol-A-dimethacrylate; pentaerythritol tetramethacrylate; allyl acrylate; allyl crotonate; allyl methacrylate; diallyl acrylate; diallyl fumarate; diallyl malate; diallyl maleate; diallyl methalate; diallyl-oxyethyl methacrylate; melamine acrylate; triallyl-5-triazine; vinyl trialloxy silane; triallyl cyanurate; 1,6-hexanediol diacrylate; divinyl benzene; diallyl amine; trimethylol propane dimethyl ether; diallyl malate methacrylate; and dihydroxyethylphthalate. For example, useful acrylate polymers can be produced as follows: one mole of styreneallyl alcohol copolymer having a molecular weight of about 1,000 can be reacted with one mole of n-methylol acrylamide; or similarly one mole toluene diisocyanate can be reacted with two moles of hydroxy-ethyl acrylate (urethane adduct); or similarly two moles of ethylene glycol can be reacted with one mole of maleic anhydride followed by direct esterification of acrylic acid (two moles) to produce an unsaturated polyester. Other useful low molecular weight cross-linking ethylenic polymers include the reaction product of two moles of acrylic or methacrylic acid with one mole of Dow epoxy resin DER333, or similarly a terpolymer of glycidyl methacrylate, ethylacrylate, styrene at a 1/1/1 mole ratio can be reacted further with one mole of acrylic acid.

The low molecular weight ethylenically unsaturated cross-linking polymer can be emulsified in water by forming an oil-in-water emulsion or alternatively a water-in-oil emulsion. The ethylenic polymer can be solubilized in water miscible solvents such as tetrahydrofuran or butyl cellosolve, and then dispersed into the water with the use of anionic or cationic surfactants as set forth in *Emulsions and Emulsion Technology* part 1 and 2, K. J. Lessant, Marcel Dekher, Inc., 1976, New York. The emulsified low molecular weight polymer phase further contains about 1% to 5% by weight of an ultraviolet sensitizer dispersed into the emulsified phase or preferably tied into the polymer backbone of the low molecular weight polymer. The ultraviolet sensitizer contained in the emulsified phase breaks up into free radicals upon exposure to ultraviolet energy whereby the free radicals activate the reactive double bonds of the ethylenic low molecular weight polymers to effect cross-linking thereof with the high molecular weight latex polymer particles. Useful ultraviolet photosensitizers include halogenated polynuclear ketones such as chlorosulfonated benzanthones, chlorosulfonated fluorenones, alpha-haloalkylated benzanthrones, and alpha-haloalkylated fluorenone as disclosed in U.S. Pat. No. 3,827,957 and similarly U.S. Pat. No. 3,827,959. Other useful photosensitizers include alkylphenones and benzophenones as disclosed in U.S. Pat. No. 3,759,807 as well as sensitizer combinations particularly suitable for pigmented coatings as suggested in U.S. Pat. Nos. 3,915,824 and 3,847,771.

The emulsified low molecular weight cross-linking polymer containing an ultraviolet sensitizer in the emulsified phase is mixed with a high molecular weight latex polymer to produce an ultraviolet curable stabilized latex composition containing between 5% and 35% by weight cross-linking polymer, and preferably between about 10% and 30%, based upon the combined weight of the cross-linking polymer and the high molecular weight primary binder polymer, that is, based upon the total film-forming solids.

The high molecular weight latex particles can be produced by an emulsion process of polymerizing monomers having carbon to carbon unsaturation such as ethylenically unsaturated monomers. Emulsion latex polymerization can be advantageously carried out at temperatures between about 45° C. and about 90° C. Suitable polymers include for example homopolymers or copolymers of organic liquids having ethylenic unsaturation and generally include for example vinyl aromatic and aliphatic hydrocarbons such as styrene, alpha-methyl styrene and similar substituted styrenes, vinyl naphthalene, vinyl toluene, divinyl benzene, and vinyl aliphatic hydrocarbons such as 1,3-butadiene, methyl-2-butadiene, 2,3-dimethyl butadiene, cyclopentadiene and dicyclopentadiene as well as ethylenically unsaturated esters and acids such as acrylic, methacrylic, ethacrylic, cinnamic and crotonic and the like and esters containing fumaric and maleic type unsaturation. Particularly preferred monomers include for example styrene, alpha-metyl styrene, tertiary butyl styrene, divinyl benzene, 1,3-butadiene, isoprene, alkyl acrylates such as ethyl acrylate, butyl acrylate, methylmethacrylate, acrylonitrile, vinyl acrylate, and vinyl methacrylate as well as similar ethylenically unsaturated monomers.

Preferably the high molecular weight latex can comprise monodisperse polymer particles produced by emulsion polymerization in an aqueous medium particularly containing surfactants to provide enough surface coverage of the polymer seed to produce a core polymer particle. A monodispersed core particle can be produced in accordance with Pierce, et al, U.S. Pat. No. 3,423,351 followed by a second stage wherein the monomers tend to overcoat the preformed monodispersed core and form a polymerized layered shell over the core and form a core/shell particle. A shell layer of a finite thickness and preferably of sufficient thickness to double the seed particle diameter can be produced by adding second stage monomer addition to form a shell polymeric layer from polymers and copolymers of ethylenically unsaturated vinyl monomers such as styrene and derivatives of styrene, vinyl toluene, vinyl naphthalene, divinyl benzene, ethylenically unsaturated butadienes, cyclopentadiene and dicyclopentadienes, ethylenically unsaturated esters such as acrylic, methacrylic, and ethacrylic as well as esters containing maleic unsaturation. The second stage addition of ethylenically unsaturated monomers can be added in bulk or by continuous addition to the aqueous solution containing the preformed monodisperse polymer seeds along with surfactants and polymerizing catalysts or initiators. Grafting between the core and the second stage polymer can occur and is desirable.

The polymerization initiator is composed of one or more water soluble, free radical generating species such as hydrogen peroxide or the sodium, potassium or ammonium persulfate, perborates, peracetates, percarbonate, and the like. As is well known in the art, these initiators may be activated by a redox system which may incorporate mold reducing agents such as sulfites and theosulfites and redox promoters such as transition metal ions. Those skilled in the art will be aware that other polymerization initiators such as relatively water insoluble organic peroxides may also be used when compatible with the polymerization system herein employed. Other initiators are benzoyl peroxide, acetyl peroxide, lauryl peroxide, acetone peroxide, cumene hydroperoxide, and the like. The initiator is normally used in amounts between 0.1 and 2 weight percent based on monomer.

Suitable surfactants include anionic, nonionic and cationic emulsifiers such as alkyl carboxylic acid salts, the alkyl sulfate salts, the alkyl sulfonate salts, the alkyl phosphate salts, the alkyl sulfo-succinate salts, the oligomeric and/or polymeric carboxylic acid salts, the alkyl aryl ether alcohols and the alkyl aryl polyether sulfate salts. Useful emulsifying agents include anionic, cationic, and nonionic surfactants. Common such emulsifying agents include common soaps, alkylbenzenesulfonates, such as sodium dodecyl benzene sulfonate, alkylphenoxy polyethylene sulfonates, sodium lauryl sulfate, salts of long-chain amines, salts of long-chain carboxylic and sulfonic acids, etc. Other useful emulsifying agents include those with multifunctional carboxyl-polyether adducts, oligomeric or polymeric carboxylic acid salts, the alkyl aryl ether alcohols and alkyl aryl polyether sulfate salts.

The high molecular weight latex polymer particles contain ethylenically unsaturated double bonds preferentially orientated on the polymer particle surface. Latex particles having unsaturated double bonds preferentially orientated on the particle surface can be produced, for example, as follows. Monomers having at least two polymerizable ethylenically unsaturated bonds wherein the respective double bonds react at substantially different rates can be copolymerized. For example, monomers can comprise allyl esters of $\alpha,\beta$-unsaturated mono and dicarboxylic acids having terminal ethylenic unsaturation. The allyl esters of ethylenically unsaturated carboxylic acids can include allyl methacrylate, allyl acrylate, diallyl maleate, diallyl fumarate and diallyl itaconate wherein the ester selected is desirably compatible with the particular monomer system utilized. Preferred and particularly useful allyl esters are the acrylate and methacrylate esters. The significant characteristic of the allyl ester or the ethylenically unsaturated carboxylic acid is differential in reaction rate between the allyl double bond and the $\alpha,\beta$ double bond. The conjugated, unsaturated acid portion of the ester reacts far more readily than the allyl group in the polymerization of the monomers in the latex polymer development and thus a substantial portion of the allyl groups remain unreacted and available for reaction during the subsequent ultraviolet curing in combination with the low molecular weight cross-linking polymer. At least about 4% by weight of the high molecular weight polymer particles comprise copolymerized difunctional monomer of allyl esters of $\alpha,\beta$-unsaturated acids, and preferably between about 4% and 20% of said difunctional monomer. Preferably the difunctional monomers are added in second-stage polymerization or near the end of monomer addition whereby a majority of unreacted allyl groups are orientated on the particle surface of the high molecular weight polymer particles and consequently can advantageously easily co-react with the low molecular weight cross-linking polymer in accordance with this invention.

In practice, the high molecular weight polymer particles are formed by emulsion copolymerizing major amounts of ethylenically unsaturated monomers with lesser amounts of a difunctional or divinyl monomer comprising an allyl ester of an $\alpha,\beta$-ethylenically unsaturated mono or dicarboxylic acid having terminal ethylenic unsaturation in the presence of 0.1 to 3.0 percent by weight emulsifier based on the weight of the monomers. Preferably the first-stage monomers are ethylenically unsaturated monomers followed by copolymerization of the allyl difunctional monomer in the latter stage to preferentially orientate the unreacted allyl groups on the surface of the high molecular weight polymer particles. Unsaturated latex particles can also be prepared by carrying out chemical reactions which allow reaction and chemical attachment of unsaturated polymerizable double bonds. Acid, hydroxyl or amino containing latexes, for example, can be reacted with an ethylenically unsaturated epoxide or aziridine. In like manner an acid, hydroxyl or amino containing ethylenically unsaturated monomer can be reacted with an epoxide or aziridine containing latex particles in the aqueous environment. Preferential polymerization and attachment of these functional monomers at or near the surface of the latex particles facilitates the latex chemical attachment of the ethylenically unsaturated monomers. An alternative is to effect chemical reactions on isolated latex particles in a nonaqueous environment and then redisperse or emulsify the unsaturated latex particles in water. Unsaturated latex particles derived for instance from diene monomers such as 1,3-butadiene, isoprene, etc., can also be utilized as the unsaturated latex.

The foregoing is illustrated by the following examples.

EXAMPLE 1

Preparation of Allyl-Unsaturated Functionality Containing Latex Procedure

HIgh Molecular Weight Particle Latex

To 673 parts water (deionized) and 3.2 parts of Polywet KX-4 surfactant. This solution is then heated to 80° C. and 33 parts of water plus 2.64 parts of ammonium persulfate is added. To this is further added 5 to 10 parts of a mixture of 227 parts butyl acrylate and 279 parts methyl methacrylate. Hold for 10 minutes then add the remainder over a 2-hour period. At the end of this time add 50 parts of allylacrylate and hold for 1 hour at 80° C. then cool. This material is a film-forming latex indicating little cross-linking of the difunctional monomer during the final staged addition and subsequent polymerization process.

EXAMPLE 2

| | Low Molecular Weight Cross-Linker | |
|---|---|---|
| A- | Trimethylol propane triacrylate (TMPTA) | 18 g. |
| | Melamine acrylate (MA) | 54 |
| | 2-Chlorothioxanthone (Sensitizer) | 1.43 |
| | Methyldiethanol Amine | 5.72 |
| B- | D.I. H$_2$O | 70 |
| | Polywet KX-4 (anionic surfactant) | 6.6 |

All the ingredients in A are stirred until 2-CTX is in solution. With A under high shear in Cowles mixer, portions of B are added.

EXAMPLE 3

Various latex mixtures comprising high molecular weight latex (Example 1) with a low molecular weight cross-linker (Example 2) were formulated as indicated in the following Table I.

Table 1

A. The latex of Example 1 (100%) that contained allylic unsaturation was cured to tack-free on a 2-bulb Ashdee ultraviolet curing unit at a very slow speed of 6 ft./min. to give a tack-free cure but gave only 3 MEK rubs.

B. A blend of 25% of the latex of Example 1 and 75% of the ultraviolet curable emulsion of Example 2 cured at 100 ft./min. good cure, tack-free, and gave 200 MEK rubs with excellent adhesion and flexibility.

C. A blend of 20% of the latex of Example 1 and 80% of the ultraviolet curable emulsion of Example 2 cured at 100 ft./min. good cure, tack-free, and gave 200 MEK rubs with excellent adhesion and flexibility.

EXAMPLE 4

High Molecular Weight Latex

An ultraviolet curable high molecular weight latex resin is prepared according to the following latex polymerization procedure. To 1160 parts by weight of deionized water is added 5.4 parts of Polywet KX-4 surfactant. The mixture is stirred and heated to 80° C. while purging dissolved oxygen by bubbling $N_2$ gas into mixture. To the stirred mixture are added 3 parts by weight of sodium persulfate dissolved in 37 parts by weight of deionized water and 2% of a monomer mixture comprising 500 parts by weight of butyl acrylate, 450 parts by weight of methyl methacrylate, and 50 parts by weight of methacrylic acid. After 10 minutes, the addition of the remaining monomer mixture is begun. The monomer mixture is added uniformly over a 2½ hour period and the stirred reaction mixture is maintained between 80° C. and 85° C. Following this addition the stirred reaction mixture is first maintained at 80° C. for 1 hour and then maintained at 90° C. for 2 hours. The resulting initiator free latex is cooled to 47° C. and sampled. The particle size is .2-.4 micron. 7.2 parts of 2(1-aziridinyl)ethyl methacrylate is added to the stirred latex. After 20 minutes the latex is cooled to room temperature and filtered. The final latex is referred to as Latex A. Conductometric titration of latex for methacrylic acid before and after the 1(2-aziridinyl)ethyl methacrylate addition reveals that it has substantially reacted onto the latex.

To 500 parts by weight of this latex (or latex of Example 1) are added 6.8 parts by weight of benzophenone, 2.6 parts by weight of Michler's ketone, and 6.8 parts by weight of dimethylethanol amine. The resultant mixture is mechanically mixed, stored for 24 hours, and a 0.6 mil wet film is drawn down on a cold rolled steel panel. After the water has evaporated a 0.3 mil film results on the panel. Panels prepared in the above fashion when run through a 2-bulb Ashdee Laboratory ultraviolet cure device at 100 ft./min. line speed do not cure. They exhibit only a few MEK double rubs. The line speed must be reduced to approximately 6 ft./min. to attain a cure exhibiting an average 100 double MEK rub resistance. At 6 ft./min. there is appreciable input of thermal energy which tends to fluidize the coating.

EXAMPLE 5

A. The latex containing acrylic unsaturation of Example 4 (100%) was irradiated at 100 ft./min. and had only 3 MEK rub solvent resistance and was also irradiated at 6 ft./min. which resulted in 100 MEK rub solvent resistance.

B. A blend of 25% latex from Example 4 with 75% ultraviolet curable low molecular weight emulsion of Example 2; or a blend of 20% latex from Example 4 with 80% ultraviolet curable emulsion of Example 2 resulted in 200 MEK rub solvent resistance at a cure speed of 100 ft./min. Both of these coatings had excellent flexibility and adhesion.

EXAMPLE 6

The ultraviolet curable emulsion of Example 2 (100%) was irradiated at 100 ft./min. and had 200 MEK rub solvent resistance but the film had no adhesion or flexibility.

EXAMPLE 7

A latex similar to Example 1 but without acrylate unsaturation. At the end of the first stage, 50 parts of butyl acrylate was added instead of the difunctional monomer allylacrylate.

EXAMPLE 8

A. The latex containing no unsaturation of Example 7 (100%) was irradiated at 6 ft./min. and had no solvent resistance (no cure).

B. The latex containing no unsaturation of Example 7 (25%) and ultraviolet curable emulsion of Example 2 (75%) were irradiated at 100 ft./min. and gave excellent adhesion and flexibility but only 20 MEK rub solvent resistance.

C. The latex containing no unsaturation of Example 7 (20%) and ultraviolet curable emulsion of Example 4 (80%) were cured in a similar manner but gave identical poor results.

All samples were sensitized in the foregoing examples with 2% 2-chlorothioxanthone and 3-5% methyldiethanol amine photoinitiator. The examples illustrate the merits of this invention containing a high molecular weight latex mixed with a low molecular weight cross-linker and cured with ultraviolet energy, but are not intended to be limiting except by the appended claims.

We claim:

1. An ultraviolet curable aqueous latex coating composition, comprising:
   an aqueous latex mixture of a high molecular weight polymer and a low molecular weight cross-linking polymer wherein the mixture contains between 5% and 35% of said low molecular weight cross-linking polymer and between 1% and 5% of an ultraviolet sensitizer based on the combined weight of the cross-linking polymer and the high molecular weight polymer;
   said high molecular weight polymer being a latex containing polymer particles having an average molecular weight greater than 100,000, said high molecular weight polymer particles comprising a core polymer of copolymerized ethylenically unsaturated monomers and a shell polymer portion of copolymerized difunctional monomers containing unreated allyl surface groups preferentially orientated on polymer particle surfaces;
   said low molecular weight cross-linking polymer having a molecular weight between about 300 and 3,000 and containing ethylenically unsaturation for cross-linking with the allyl surface groups on said high molecular weight polymer particles upon exposure to ultraviolet energy.

2. The composition in claim 1 wherein the latex mixture contains 10% to 30% of said low molecular weight cross-linking polymer based upon the combined weight of the cross-linking polymer and the high molecular weight polymer.

3. The composition in claim 1 wherein the high molecular weight polymer particles contain a shell portion produced by co-reacting between about 4% and 20 allyl esters of alpha-beta unsaturated carboxylic acids based on the copolymerized difunctional monomer forming the shell portion.

4. The composition in claim 1 wherein the ultraviolet sensitizer is incorporated into the low molecular weight cross-linking polymer phase of the latex mixture.

* * * * *